(12) United States Patent
De Nigris et al.

(10) Patent No.: US 12,493,972 B2
(45) Date of Patent: Dec. 9, 2025

(54) SYSTEMS AND METHODS FOR SEGMENTING 3D IMAGES COMPRISING A DOWNSAMPLER, LOW-RESOLUTION MODULE TRAINED TO INFER A COMPLETE LOW-RESOLUTION SEGMENTATION AND GENERATE CORRESPONDING LOW-RESOLUTION FEATURE MAPS FROM AN INPUT DOWNSAMPLED HIGH-RESOLUTION 3D IMAGE AND HIGH-RESOLUTION MODULE TRAINED TO INFER A COMPLETE HIGH-RESOLUTION SEGMENTATION FROM AN INPUT FROM THE LOW-RESOLUTION MODULE AND 3D HIGH-RESOLUTION IMAGE

(71) Applicant: AFX MEDICAL INC., Montreal (CA)

(72) Inventors: Dante De Nigris, Montreal (CA);
Gabriel Chartrand, Magog (CA);
Simon Ducharme, Montréal (CA)

(73) Assignee: AFX MEDICAL INC., Montreal (CA)

( * ) Notice: Subject to any disclaimer, the term of this patent is extended or adjusted under 35 U.S.C. 154(b) by 362 days.

(21) Appl. No.: 18/030,698

(22) PCT Filed: Sep. 28, 2021

(86) PCT No.: PCT/CA2021/051349
§ 371 (c)(1),
(2) Date: Apr. 6, 2023

(87) PCT Pub. No.: WO2022/073100
PCT Pub. Date: Apr. 14, 2022

(65) Prior Publication Data
US 2023/0386067 A1 Nov. 30, 2023

Related U.S. Application Data

(60) Provisional application No. 63/088,717, filed on Oct. 7, 2020.

(51) Int. Cl.
*G06T 7/11* (2017.01)
*G01R 33/56* (2006.01)
(Continued)

(52) U.S. Cl.
CPC ............ *G06T 7/62* (2017.01); *G01R 33/5608* (2013.01); *G06T 3/40* (2013.01); *G06T 7/0012* (2013.01);
(Continued)

(58) Field of Classification Search
CPC ............ G06N 3/045; G06N 3/04; G06N 3/08; G06N 5/04; G06N 5/041; G06N 5/042;
(Continued)

(56) References Cited

U.S. PATENT DOCUMENTS

2017/0347061 A1 11/2017 Wang et al.
2018/0300855 A1 10/2018 Tang et al.
(Continued)

FOREIGN PATENT DOCUMENTS

CN 110084309 A 8/2019
CN 110163801 A 8/2019

OTHER PUBLICATIONS

International Search Report and Written Opinion mailed Dec. 10, 2021, for Application No. PCT/CA2021/051349 (17 pages).
(Continued)

*Primary Examiner* — Chad Dickerson
(74) *Attorney, Agent, or Firm* — KDW FIRM PLLC (57) ABSTRACT

Systems and methods for segmenting 3D images are provided. In an embodiment, the system includes a neural network having a low-resolution module trained to infer a complete low-resolution segmentation from an input low-resolution 3D image and to generate corresponding low-resolution feature maps; and a high-resolution module trained to infer a complete high-resolution segmentation
(Continued)

from an input high-resolution 3D image and the feature maps from the low-resolution module. Methods for training the neural network and measuring a volume of an object using the 3D segmentations are also described.

11 Claims, 5 Drawing Sheets

(51) Int. Cl.
   *G06N 3/0464* (2023.01)
   *G06T 3/40* (2006.01)
   *G06T 7/00* (2017.01)
   *G06T 7/62* (2017.01)

(52) U.S. Cl.
   CPC ...... *G06T 7/11* (2017.01); *G06T 2207/10088* (2013.01); *G06T 2207/20081* (2013.01); *G06T 2207/20084* (2013.01); *G06T 2207/30016* (2013.01)

(58) Field of Classification Search
   CPC ........ G06N 5/043; G06N 5/045; G06N 5/046; G06N 5/048; G06N 5/0464; G06T 2207/10081; G06T 2207/10088; G06T 2207/20081; G06T 2207/20084; G06T 2207/30016; G06T 3/40; G06T 7/0012; G06T 7/11; G06T 7/62; G06T 7/10092; G06T 7/10096; G06T 7/20221; G06T 7/20212
   USPC .................................................. 382/128, 131
   See application file for complete search history.

(56) References Cited

U.S. PATENT DOCUMENTS

| | | | |
|---|---|---|---|
| 2019/0050640 A1* | 2/2019 | Sarkar | G06V 30/416 |
| 2019/0066265 A1* | 2/2019 | Lin | G06N 3/045 |
| 2020/0218961 A1* | 7/2020 | Kanazawa | G06N 3/045 |
| 2020/0364870 A1 | 11/2020 | Lee et al. | |
| 2021/0065337 A1* | 3/2021 | Bai | G06F 18/2148 |
| 2021/0104015 A1 | 4/2021 | Wang et al. | |

OTHER PUBLICATIONS

Dennis Bontempi, Sergio Benini, Alberto Signoroni, Michele Svanera, Lars Muckli. CEREBRUM: a fast and fully-volumetric Convolutional Abhijit Guha Roy, Sailesh Conjeti, Nassir Navab, Christian Wachinger. QuickNAT: A Fully Convolutional Network for Quick and Accurate Segmentation of Neuroanatomy. Nov. 27, 2018. https://arxiv.org/abs/1801.04161Encoder-decodeR for weakly-supervised segmentation of BRain strUctures from out-of-the-scanner MRI. Sep. 26, 2019. https://arxiv.org/abs/1909.05085.

Dennis Bontempi, Sergio Benini, Alberto Signoroni, Michele Svanera, Lars Muckli. CEREBRUM: a fast and fully-volumetric Convolutional Encoder-decodeR for weakly-supervised segmentation of BRain structures from out-of-the- scanner MRI. Sep. 26, 2019. https://arxiv.org/abs/1909.05085.

Abhijit Guha Roy, Sailesh Conjeti, Nassir Navab, Christian Wachinger. QuickNAT: A Fully Convolutional Network for Quick and Accurate Segmentation of Neuroanatomy. https://arxiv.org/abs/1801.04161. Nov. 24, 2018.

* cited by examiner

SYSTEMS AND METHODS FOR SEGMENTING 3D IMAGES COMPRISING A DOWNSAMPLER, LOW-RESOLUTION MODULE TRAINED TO INFER A COMPLETE LOW-RESOLUTION SEGMENTATION AND GENERATE CORRESPONDING LOW-RESOLUTION FEATURE MAPS FROM AN INPUT DOWNSAMPLED HIGH-RESOLUTION 3D IMAGE AND HIGH-RESOLUTION MODULE TRAINED TO INFER A COMPLETE HIGH-RESOLUTION SEGMENTATION FROM AN INPUT FROM THE LOW-RESOLUTION MODULE AND 3D HIGH-RESOLUTION IMAGE

CROSS-REFERENCE TO RELATED APPLICATIONS

This is a National Stage Application, filed under 35 U.S.C. 371, of International Patent Application No. PCT/CA2021/051349, filed on Sep. 28, 2021, which claims the benefit of and priority under 35 U.S.C. § 119 to U.S. provisional patent application Ser. No. 63/088,717 filed on Oct. 7, 2020, the entirety of which applications are incorporated by reference herein for all purposes.

TECHNICAL FIELD

The technical field generally relates to 3D imaging, and more specifically to systems and methods for segmenting 3D images into individual structures to estimate their volume and/or analyze their shape.

BACKGROUND

Computing the volumetry of structures from images, such as medical images, requires that the images be segmented into individual parts. The result of the segmentation can be a second image, referred to as a labelmap, of the same size as the original image, where each pixel of the original image corresponds to an ID on the segmentation labelmap.

Current methods to perform segmentation of brain MRI images usually rely on a multi-atlas registration algorithm, such as FreeSurfer. Some limitations of this approach include: long running time (a few minutes to a few hours); large deviation from the atlas yields poor performance; repeatability across rescan is sub-optimal; and being limited to high resolution scans.

Recently, methods based on convolutional neural networks (CNN) have been shown to produce state of the art performances on several benchmarks of natural images for the task of 2D segmentation.

However, the main challenge when applying this technique to 3D images is the memory available on a single graphical processor unit (GPU). Given that medical images can consume about 250× more memory, careful attention must be given to the architecture of the neural network. This memory constraint is further amplified by the need to segment a large number of anatomical regions (e.g. over one hundred regions). The reason for this is that the memory requirements of the fixed network topology tend to increase linearly with the number of regions being labelled.

In order to use CNN on 3D images, current approaches separate the input 3D image into either individual 2D images or smaller 3D patches of the original volumes. At least two challenges arise from this approach: (1) individually predicted patches lack global context to produce inference, hence yielding sub-optimal results; and (2) individually predicted patches need to be reassembled, or stitched, into the complete volume, which lead to misalignment issues between parts.

Alternatively, there is at least one previously proposed approach which aims to make use of the global 3D context using a CNN on the full 3D volume. However, it does so at the expense of drastically reducing the number of segmented regions (e.g. only seven regions are segmented).

There is therefore a need for improved systems and methods for segmenting 3D images which alleviates at least some of the shortcomings of the prior art.

SUMMARY

According to an aspect, a system for segmenting 3D images is provided. The system includes: a computer-implemented neural network module including: a low-resolution module trained to infer a complete low-resolution segmentation from an input low-resolution 3D image and to generate corresponding low-resolution feature maps; and a high-resolution module trained to infer a complete high-resolution segmentation from an input high-resolution 3D image and the feature maps from the low-resolution module.

According to an aspect, a method for training a neural network to segment high-resolution 3D images is provided. The method includes: training a low-resolution module of the neural network using low-resolution 3D images and corresponding low-resolution segmentations, the low-resolution module being configured to infer a complete low-resolution segmentation from an input low-resolution 3D image and to generate corresponding low-resolution feature maps; and training a high-resolution module of the neural network using high-resolution 3D image patches and corresponding high-resolution segmentation patches, the high-resolution module being configured to infer a high-resolution segmentation patch from an input high-resolution segmentation patch and the low-resolution feature maps from the low-resolution module.

According to an aspect, a method for segmenting 3D images using a trained neural network is provided. The method includes: receiving a high-resolution 3D image to be segmented; downsampling the high-resolution 3D image and providing the downsampled image as an input to a low-resolution module trained to generate low-resolution feature maps while inferring a complete low-resolution segmentation from the downsampled image; and providing the high-resolution 3D image and the low-resolution feature maps as an input to a high-resolution module trained to infer a complete high-resolution segmentation from said input.

According to an aspect, a method for measuring a volume of an object is provided. The method includes: acquiring a high-resolution 3D image of the object; segmenting the high-resolution 3D image using the method as described above; and counting voxels in at least one segmented region to determine the volume of said at least one segmented region.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment.

DETAILED DESCRIPTION

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

Figure 1:
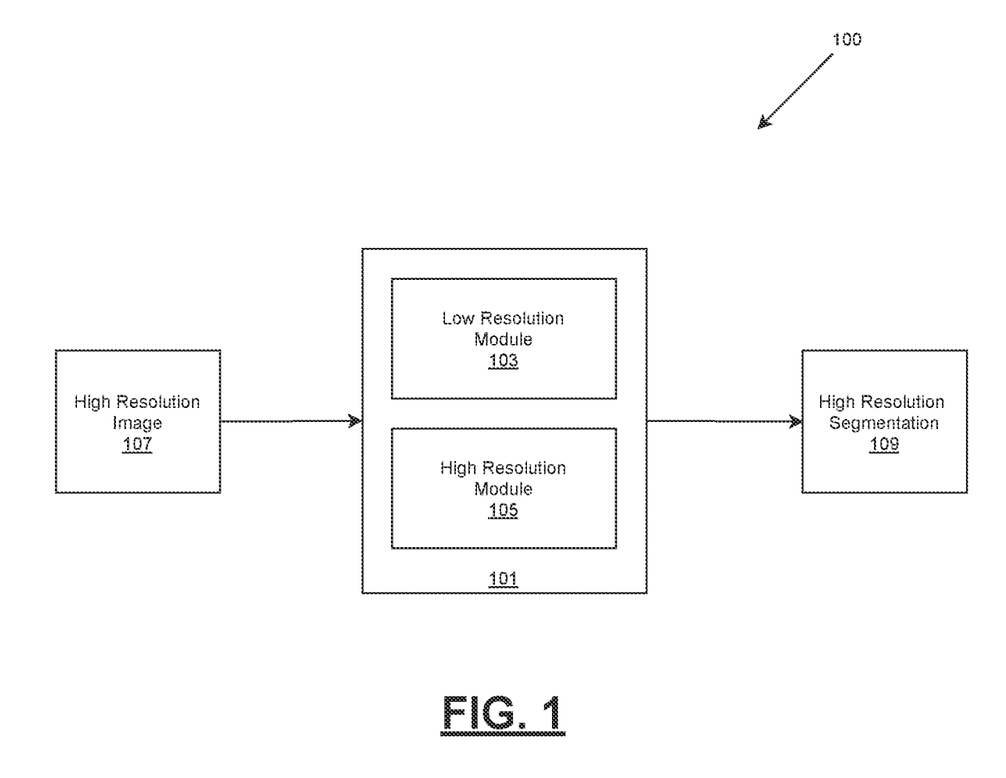
FIG. 1 is a schematic of a system for segmenting 3D images, according to an embodiment.

With reference to FIG. 1, an exemplary system 100 for segmenting 3D images is shown according to an embodiment. Broadly described, the system 100 comprises a neural network module 101 configured to receive a high-resolution image 107 as an input and to produce therefrom an inference in the form of a high-resolution segmentation 109 of the input image.

As can be appreciated, the high-resolution image 107 can correspond to a 3D image acquired via an image acquisition device. For example, the high-resolution image 107 can be a medical image such as a magnetic resonance imaging (MRI) brain scan, although it is appreciated that other 3D images are possible such as those acquired via electronic microscopy (EM), industrial computed tomography (CT), or other techniques for acquiring 3D images of biological or non-biological specimens. The 3D image can be received in various different formats, such as the DICOM format in the case of 3D medical images. In some embodiments, the 3D image can be received as a plurality of 2D slices, and the 3D image can be reconstructed therefrom.

In the embodiments described herein, input image 107 is said to be "high-resolution" in that the image allows resolving a high amount of detail. As can be appreciated, the term "high-resolution" is relative, and can refer to an input image that has a resolution which is higher than a corresponding "low-resolution" image which, as will be described in more detail hereinafter, can be used during intermediate processing steps. By way of example, in some embodiments, a high-resolution image can correspond to a 3D image having a size of 256×256×256 voxels, whereas a low-resolution image can be a fraction of the size of the high-resolution image, such as ¼ the size at 64×64×64 voxels. It is appreciated, however, that different sizes and aspect ratios of high-resolution and low-resolution images are possible. It should be further appreciated that the high-resolution input image 107 can correspond substantially to the full 3D volume as received from the image acquisition device, such that substantially the full image can be processed as opposed to an image that has been significantly cropped or downsampled to facilitate processing at the expense of accuracy and/or precision.

The output segmentation 109 corresponds to an image (in some embodiments referred to as a labelmap) in which a plurality of distinct parts or regions of the input image 107 have been identified, and in which each voxel of the image is associated with and/or labelled according to a corresponding one of the identified parts or regions. The output image 109 is of the same size as the input image 107 and can therefore be said to be "high-resolution" as well. As can be appreciated, the output segmentation 109 can include a high number of identified parts, such as more than and in some embodiments more than 100. For input images of complex anatomical structures, such as a brain MRI for example, this can allow for sufficient anatomical regions to be segmented and identified for precise and meaningful analysis.

The neural network module 101 comprises one or more neural networks trained on high-resolution training images such that the module 101 can recognize and produce corresponding high-resolution segmentations. It is understood that the neural networks can be implemented using computer hardware elements, computer software elements or a combination thereof. Accordingly, the neural networks described herein can be referred to as being computer-implemented. Various computationally intensive tasks of the neural network can be carried out on one or more processors (central processing units and/or graphical processing units) of one or more programmable computers. For example, and without limitation, the programmable computer may be a programmable logic unit, a mainframe computer, server, personal computer, cloud based program or system, laptop, personal data assistance, cellular telephone, smartphone, wearable device, tablet device, virtual reality device, smart display devices (ex: Smart TVs), set-top box, video game console, or portable video game device, among others. In the present embodiment, the neural network module 101 comprises an architecture that includes two separate modules, namely a low-resolution module 103 and a high-resolution module 105. Each of the low-resolution 103 and high-resolution 105 modules can implement neural networks that are based on a 3D convolution neural network (CNN). As can be appreciated, CNNs are suitable for analyzing imagery given that they are space or shift invariant, although it is appreciated that other types of neural networks are also possible.

As will be described in more detail hereinafter, the low-resolution module 103 can be trained independently to produce complete 3D low-resolution segmentations, while the high-resolution module 105 can be trained to produce high-resolution segmentations. The neural network 101 can be trained (i.e. fitted, regressed) in two stages. First, the low-resolution module 103 can be trained to produce 3D low-resolution segmentations from 3D low-resolution images. Second, the high-resolution module 105 can be trained to produce high-resolution segmentation 3D patches from high-resolution 3D image patches and low-resolution 3D feature map patches obtained from the low-resolution module 103. At inference time, both modules 103, 105 can be connected together to produce a complete high-resolution 3D segmentation in a single pass.

As can be appreciated, this two-stage approach can allow benefiting from the performance and robustness advantages provided by CNNs while avoiding the global context and stitching challenges of typical CNN-based approaches by taking into account the global context of the full 3D volume. It can further allow scaling to a high number of anatomical regions (e.g. 100+ anatomical regions), thus allowing to maintain a desired level of performance and robustness without having to drastically reduce the number of segmented regions to respect memory or other resource constraints.

Figure 2:
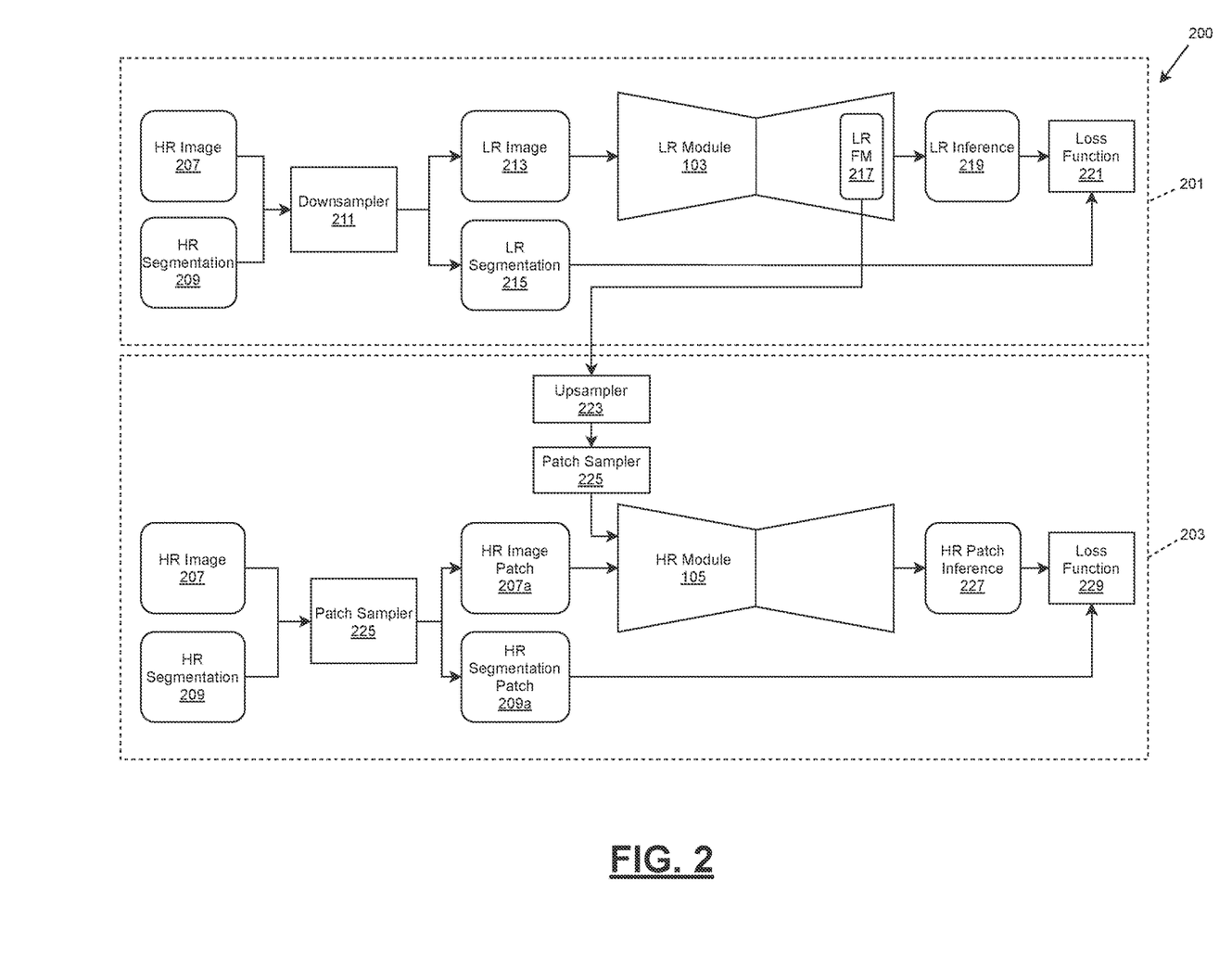
FIG. 2 is a schematic of a method of training the neural network in the system of FIG. 1 using a training dataset comprising 3D images and corresponding segmentations, according to an embodiment.

With reference now to FIG. 2, an exemplary method 200 of training a deep 3D CNN, such as neural network 101, is shown according to an embodiment. As will be appreciated, the neural network 101 can be trained via supervised learning techniques. Accordingly, to train the neural network 101, a dataset comprising a plurality of 3D image with corresponding ground truth segmentations will need to be provided. Preferably, the plurality of images should have the same photometric profiles (e.g. all T1-weighted images), have known spacing in each dimension, represent a diversity of healthy and non-healthy patients to account for anatomical variations encountered in real life, be collected from a plurality of different centers or studies, and should be significant in number (e.g. in the thousands). Preferably still, the plurality of images can all correspond to images of the same object and/or anatomical structure to which the neural network is to be trained/fitted.

In practice, the images and segmentations can be received from one or more external data sources (not illustrated), such as from one or more open health databases. As one skilled in the art would appreciate, open health databases can include a plurality of 3D medical images acquired via one or more medical imaging devices, at one or more different locations, by one or more different parties, and/or in one or more different contexts (for example as part of one or more different studies). The received dataset can include segmentations corresponding to each 3D image. Such segmentations may have been performed manually, via one or more existing segmentation algorithms, and/or may have been manually validated. Each segmentation can thus be taken as an accurate representation of the boundaries of the various anatomical regions in the 3D image to which it corresponds. Preferably, the segmentations have not been simplified, and include a high number of identified parts or regions (for example 100+ anatomical regions in the case of a brain MRI scan).

The received images can be normalized, for example via pre-processing and resampling to a common predetermined shape and/or size. In the present embodiment, the predetermined shape and size corresponds to 256×256×256 voxels, although it is appreciated that other sizes and shapes are also possible. The received images can further be separated into training, validation, and testing datasets.

As illustrated in FIG. 2, the method 200 of training the neural network can be carried out in two phases for each image and corresponding segmentation in the training dataset. In a first phase 201, the low-resolution module 103 of the neural network 101 is trained on low-resolution images. This can involve providing a pair of a high-resolution image 207 and corresponding high-resolution segmentation from the training dataset, and converting the pair into a corresponding low-resolution image 213 and a low-resolution segmentation 215 via a downsampler 211. As can be appreciated, any suitable downsampling algorithm can be implemented in downsampler 211, provided that it produces low-resolution images and segmentations that are scaled to a smaller size than the corresponding high-resolution images and segmentations, such as ½ the size, ¼ the size, etc. In the present embodiment, the high-resolution image 207 and segmentation 209 are 256×256×256 voxels, and the downsampler 211 downsamples by ¼ to produce low-resolution image 213 and segmentation 215 of 64×64×64 voxels. It is appreciated, however, that other configurations are possible.

The downsampled low-resolution image 213 can then be provided to the low-resolution module 103 which can generate a low-resolution inference 219 therefrom in the form of a segmentation of the low-resolution image 213. A loss function 221 can then be provided to compare the inferred low-resolution segmentation 219 with the truth low-resolution segmentation 215, and optimize the CNN model of the low-resolution module 103 as necessary to reduce inference error. As can be appreciated, any suitable loss function 221 can be used for this purpose.

In a second phase 203, the high-resolution module 105 of the neural network 101 is trained on high-resolution images and at least some output from the low-resolution module 103. As can be appreciated, to optimize memory usage while training the CNN of the high-resolution module 105, the model can be trained on patches (i.e. subsets or portions) of high-resolution images and segmentations, as opposed to high-resolution images and segmentations in their entirety. As can be appreciated, the patches used to train the model can all be of the same predetermined size. For example, in the present embodiment, the patches are all 32×32×32 voxels, although it is appreciated that other patch sizes are possible provided the patches are smaller in size than the high-resolution images.

In the present embodiment, a patch sampler 225 is provided to extract a high-resolution image patch 207a and high-resolution segmentation patch 209a from the high-resolution image 207 and segmentation 209. Preferably, the patch sampler 225 is configured to extract patches that fairly and evenly represent the training dataset. More specifically, the patch sampler 225 can be configured to randomly sample patches of different areas of different high-resolution images/segmentations of training dataset. In this fashion, the sampled patches can correspond to a substantially even distribution, such that certain small areas of high-resolution images/segmentations are not underrepresented, and such that the high-resolution module 105 is not eventually overfitted to areas of high-resolution images/segmentations. In some embodiments, a min-batch can be built by uniformly sampling anatomies. Each anatomy can be sampled evenly, even though their size may differ. Once an anatomy is chosen, a voxel corresponding to that anatomy can then be randomly selected as the center of the patch, and the patch of the predetermined size (such as 32×32×32) can be cropped around that voxel.

It is appreciated, however, that other sampling strategies are also possible. For example, in some embodiments, the patch sampler 225 can be configured to sample at most a predetermined number of patches from any single image/segmentation of the training data. Where a plurality of patches are sampled from a single image/segmentation, the patch sampler 225 can be configured to obtain samples that are a minimum predetermined distance from one anther and/or samples that do not overlap or only overlap to a maximum predetermined threshold.

As can be appreciated, any suitable algorithm can be used to extract patches, provided that the patches correspond to portions or subsets of the source images and segmentations, and provide that the portion/subset of source image covered by image patch corresponds to the same portion/area of source segmentation covered by segmentation patch. As can be further appreciated, the patch sampler 225 can be configured to extract patches having any suitable size and shape. For example, as mentioned above, in the present embodiment the extracted patches have a size of 32×32×32 voxels, although it is appreciated that different patch sizes are possible depending on memory and resource limitations. The high-resolution image patch 207*a* is provided as an input to train the high-resolution module 105, along with global context information for the image patch. In the present embodiment, the global context information is provided in the form of an output from the low-resolution module 103 which was trained on uncropped low-resolution images 213. More specifically, the output used for this purpose corresponds to low-resolution feature maps 217 from the low-resolution module 103. In the present embodiment, the feature maps are 64-channel feature maps, but it is appreciated that other feature map configurations are also possible. As can be appreciated, feature maps 217 correspond to an intermediate output of the low-resolution module 103. More particularly, low-resolution feature maps 217 are an intermediate data representation preceding logits, the latter being non-normalized predictions (e.g.: not bound between 0 and 1) generated by low-resolution module 103 in response to the low-resolution copy 213 of the high-resolution image 207 from which patch 207*a* was extracted. Since the low-resolution module 103 is trained on the entirety of the volume represented by the source image 207, the output of low-resolution module 103 can provide global context information to help make a better prediction from patch 207*a*. Although in the present embodiment low-resolution feature maps 217 are provided as input to high-resolution module 105, it is appreciated that in other embodiments, other outputs of the low-resolution module 103 can be used. For example, in some embodiments, the low-resolution inference 219 or low-resolution logits can be provided as input to high-resolution module 105. However, low-resolution feature maps 217 are preferred since they include unbounded intermediate raw information that can provide more context.

As illustrated, the low-resolution feature maps output 217 is cropped and aligned with the corresponding high-resolution image patch 207*a* prior to being provided to high-resolution module 105 as an input. For example, an indication of where the patch 207*a* belongs relative to source image 207 can be provided to patch sampler 225, and this can be used to crop low-resolution feature maps 217 so that it is properly aligned. Moreover, the feature maps patch can be resized to match the high-resolution image patch 207*a*. For example, the feature maps output 217 can be converted to the same resolution as source high-resolution image 207 via an upsampler 223 (in this case from 64×64×64 to 256×256×256 voxels), and the patch sampler 225 can extract a patch from the upsampled feature maps that is aligned with the high-resolution patch 207*a*. Alternatively, the feature maps patch can be extracted at the desired location, and the extracted patch can subsequently be upsampled to match the resolution of the high-resolution patch 207*a*. As can be appreciated, any suitable upsampling techniques can be used to upsample the feature maps 217 to the desired sized, such as nearest neighbor interpolation, bilinear or bicubic interpolation, etc.

Following receipt of the high-resolution image patch 207*a* and the upsampled low-resolution feature maps 217 patch as input, the high-resolution module 105 can generate a high-resolution inference 227 therefrom in the form of a segmentation of the high-resolution image patch 207*a*. A loss function 229 can then be provided to compare the inferred high-resolution patch segmentation 227 with the truth high-resolution segmentation patch 209*a* and optimize the CNN model of the high-resolution module 105 as necessary to reduce inference error. As can be appreciated, any suitable loss function 229 can be used for this purpose.

Figure 3:
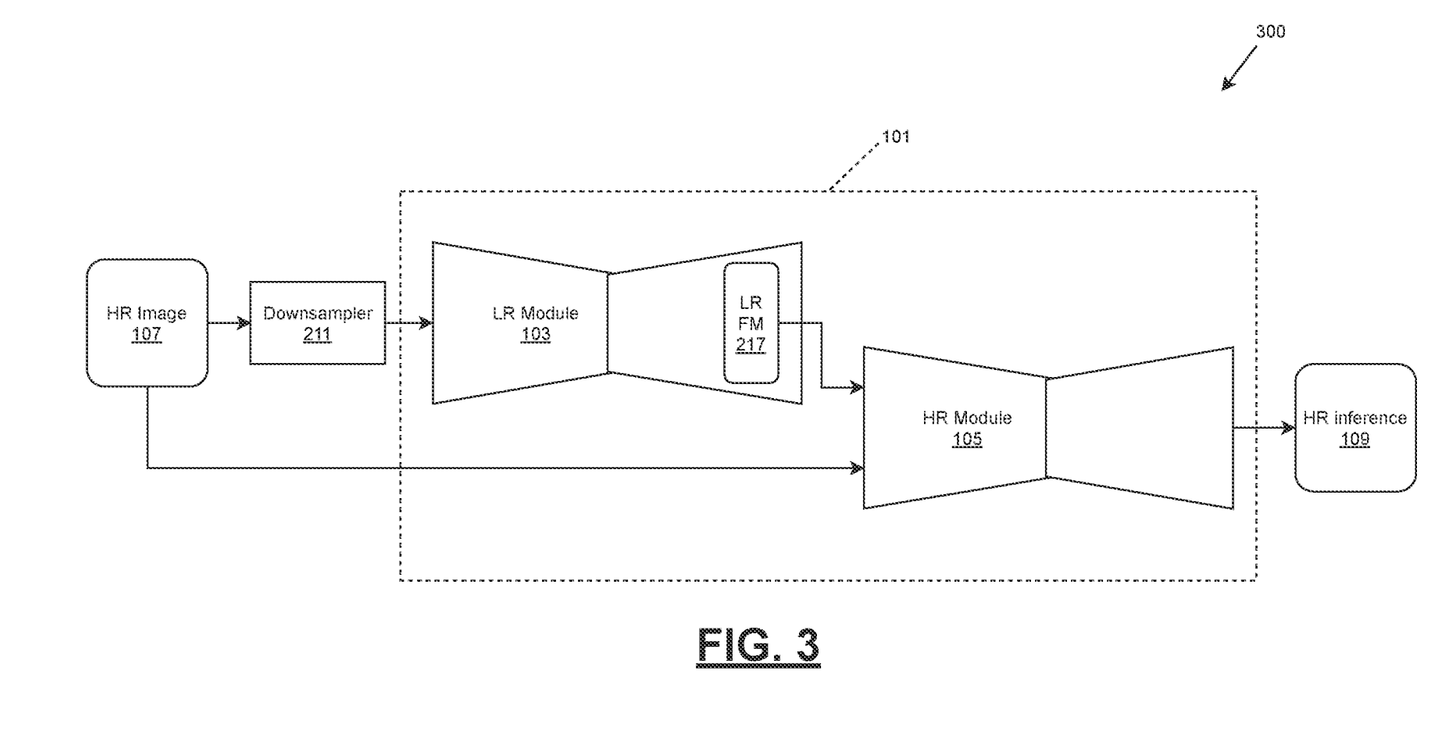
FIG. 3 is a schematic of a method of segmenting 3D images using the trained neural network in the system of FIG. 1, according to an embodiment.
Figures 4, 4A, 4B:
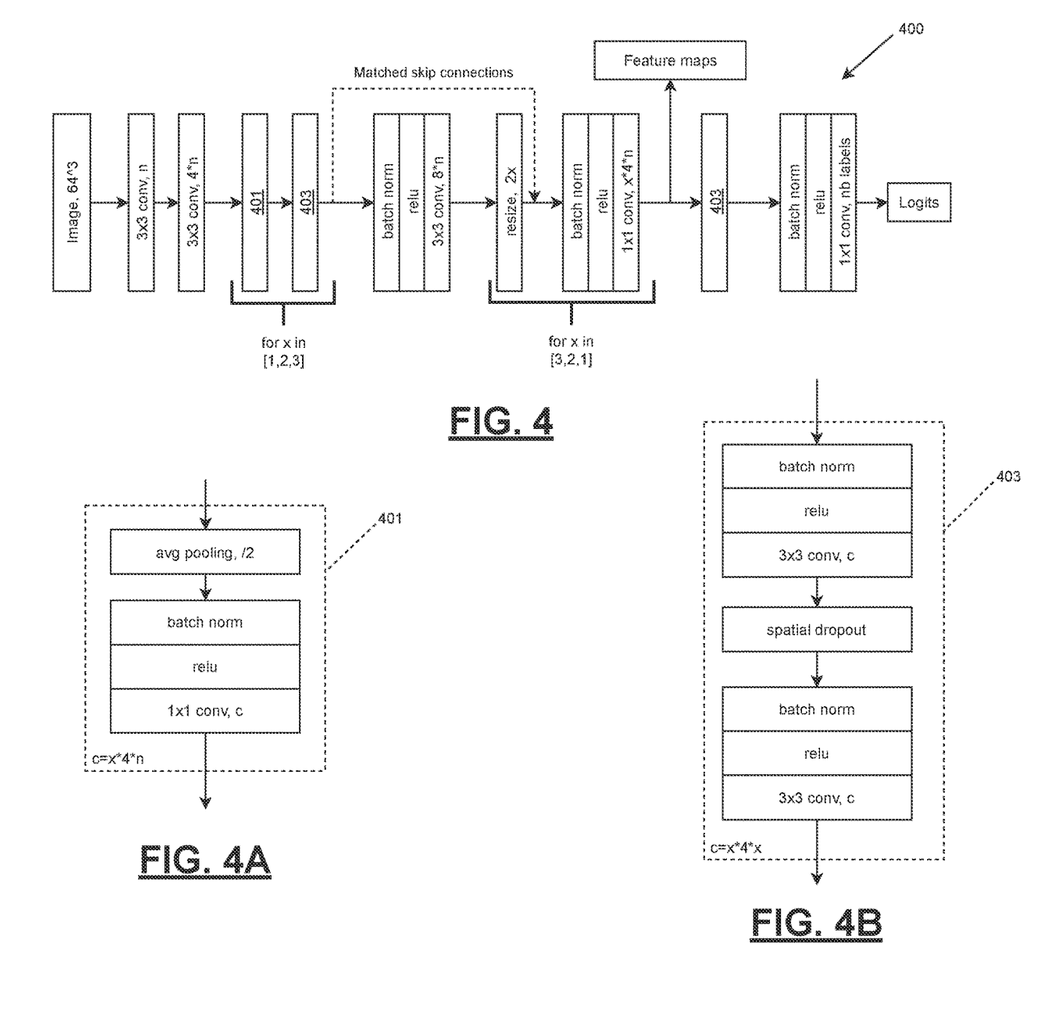
FIGS. 4, 4A and 4B are schematics of an exemplary architecture of a neural network model for a low-resolution module of a neural network for segmenting 3D images, according to an embodiment.

As can be appreciated, the first 201 and second 203 phases of the above-described method 200 can be carried out for each image and corresponding segmentation in the training dataset until the neural network 101 is sufficiently trained. Although not illustrated, it is appreciated that the trained neural network 101 can be validated and tested as needed to confirm that it behaves as expected and with sufficient accuracy. For example, in some embodiments, the method 200 can be carried out to train a plurality of candidate CNN algorithms for low-resolution 103 and high-resolution 105. In such embodiments, the validation dataset can be used to identify and select an optimal CNN configuration. Similarly, once an optimal CNN configuration has been selected, the test dataset can be used to measure the accuracy and other performance parameters of the trained neural network 101. At inference time, the low-resolution module 103 and the high-resolution module 105 can be chained together to produce a segmentation of a complete high-resolution 3D image in one pass. For example, with reference to FIG. 3, a method 300 of segmenting a high-resolution 3D image 107 using a trained neural network module 101 is shown according to an embodiment. The method 300 can first involve receiving a high-resolution 3D image 107 to be segmented. The image 107 can, for example, be received from an image acquisition device, such a medical imaging device. In some embodiments, image data from the image acquisition device can be parsed and constructed to form the 3D image 107. Next, the received high-resolution 3D image 107 can be downsampled (such as via downsampler 211) and the downsampled image can be provided as an input to low-resolution module 103. Using the provided input, the low-resolution module 103 can generate corresponding low-resolution feature maps 217. Next, the low-resolution feature maps 217 can be provided as an input to high-resolution module 105, along with the complete (i.e. full-resolution and not downsampled) high-resolution 3D image 107. Finally, high-resolution module 105 can generate a high-resolution inference 109 in the form of a complete high-resolution segmentation, based on the low-resolution feature maps 217 and the high-resolution image 107. As can be appreciated, the low-resolution module 103 and the high-resolution module 105 can be configured to implement different CNN architectures suitable for their respective tasks. For example, a possible embodiment of a CNN architecture 400 for low-resolution module is shown in FIGS. 4, 4A and 4B. The illustrated architecture is substantially inspired by the U-Net architecture. More specifically, the network architecture comprises a contracting and expanding path connected by a convolutional block 401. The contracting path comprises a number of initial convolution operations followed by a number of successive pooling block, convolutional block 401 and dropout block 403, repeated R times. The expanding path comprises a number of upsampling and convolutional block 401, matching the same number of block repetitions R in the contracting path. Long skip connections add the output of each dropout block 403 in the contracting path to the corresponding input of convolutional block 401 in the expanding path. Finally, a dropout block 403 followed by convolutional block 401 produces the logits used to compute the loss. Once trained, information rich feature maps can be extracted prior to the last dropout block 403. It is appreciated, however, that other CNN architectures for low-resolution module are also possible. Preferably, such architectures are fully convolutional and comprise a contracting and expanding path connected by multiple skip connections. Such architectures force the network to learn a dense representation of image content and transform it back to its original resolution while preserving spatial details, a network topology suitable for semantic segmentation tasks.

Figure 5:
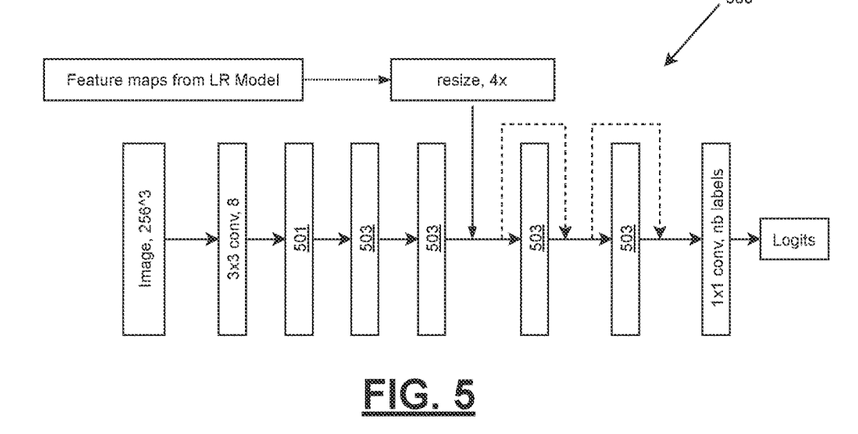
FIGS. 5, 5A and 5B are schematics of an exemplary architecture of a neural network model for a high-resolution module of a neural network for segmenting 3D images, according to an embodiment.
Figure 5A:
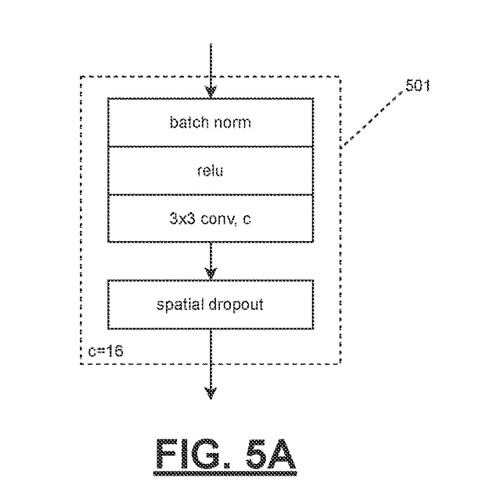
Figure 5B:
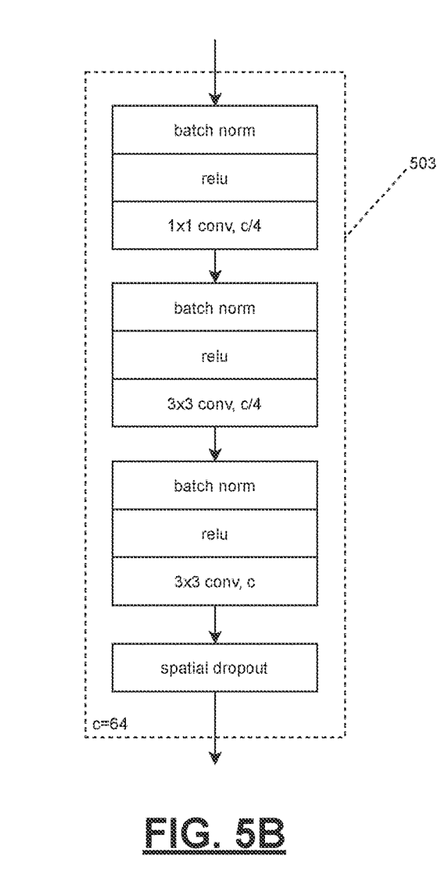

As another example, a possible embodiment of a CNN architecture 500 for high-resolution module is shown in FIG. 5. The illustrated architecture is substantially inspired by the ResNet architecture. More specifically, it comprises an initial convolution layer followed by a dropout block 501 and two bottleneck blocks 503. At this point, feature maps from the low-resolution model are concatenated to the input of the two following bottleneck blocks 503, both of which have identity mapping added to their output in the form of residual connections. Lastly, a final convolutional layer provides the logits used to compute the loss value. It is appreciated, however, that other CNN architectures for high-resolution module are also possible. Preferably, such architectures are fully convolutional and can integrate, at some point after the first convolution and before the last convolution, the feature maps provided by a lower resolution model.

In an embodiment, the above-described systems and methods for segmenting 3D images can be used for volumetry purposes. As an example, the trained neural network can be utilized to segment 3D scans of a brain and measure anatomical regions thereof for clinical purposes. This can comprise receiving MRI brain scan data, for example in the DICOM format, and parsing the image pixel data to reconstruct a volumetric image (i.e. 3D image) with known pixel and slice thickness. This image can then be resampled to an isometric voxel spacing (i.e. same spacing in all three dimensions) using any suitable technique, such as via bilinear interpolation or other techniques. The image can then be provided as an input to the trained neural network 101 which can produce a segmentation of the same shape as the input image. Since the volume of each voxel is known from the voxel spacing, a simple count of each segmentation label can provide a precise measurement of the volume (for example with a precision of within 1 mm). This volumetric information can be used in a number of subsequent clinical applications, such as comparison with normative data.

Although the systems and methods have been described primarily in connection with segmentation of 3D brain MRI images for volumetry purposes, it is appreciated that many other applications are possible. In particular, the systems and methods described herein can be agnostic to the type of 3D images. Accordingly, the systems and methods can be applied to segment and/or measure volumetry of other medical and/or non-medical images in different contexts. As can be further appreciated, the systems and methods described herein can overcome limitations with existing segmentation techniques. For example, the architecture of neural network 101 described herein can allow for a "full" input volume to be segmented, in contrast with existing techniques that would require segmenting the input image by parts. As another example, the architecture of neural network 101 can allow a large number of anatomical regions (or other types of regions) to be segmented, such as up to 100 regions, or 115 regions or more, while respecting resource limitations (such as limited memory in GPUs). This can result in up to 16 times more regions being segmented as compared to existing techniques which may require limiting the segmentation to approximately seven anatomical regions.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A system for segmenting 3D images, the system comprising:
 a downsampler configured to downsample an input high-resolution 3D image to produce a low-resolution 3D image; and
 a computer-implemented neural network module comprising:
  a low-resolution module trained to infer a complete low-resolution segmentation from the low-resolution 3D image and to generate corresponding low-resolution feature maps; and
  a high-resolution module trained to infer a complete high-resolution segmentation from the input high-resolution 3D image and the feature maps from the low-resolution module.

2. The system according to claim 1, wherein the low-resolution module and the high-resolution module are chained together to produce the complete high-resolution segmentation from the input high-resolution 3D image in a single pass.

3. The system according to claim 1, wherein the low-resolution module and the high-resolution module each implement a corresponding convolutional neural network.

4. The system according to claim 1, wherein the high-resolution module is trained on a plurality of high-resolution 3D image patches and corresponding low-resolution feature maps patches from the low-resolution module.

5. A method for segmenting 3D images using a trained neural network, the method comprising:
 receiving a high-resolution 3D image to be segmented;
 downsampling the high-resolution 3D image and providing the downsampled image as an input to a low-resolution module trained to generate low-resolution feature maps while inferring a complete low-resolution segmentation from the downsampled image; and
 providing the high-resolution 3D image and the low-resolution feature maps as an input to a high-resolution module trained to infer a complete high-resolution segmentation from said input.

6. The method according to claim 5, wherein the high-resolution module is trained to infer the high-resolution segmentation comprising up to at least 100 labelled regions.

7. The method according to claim 5, wherein receiving the high-resolution 3D image comprises receiving a plurality of 2D image slices and reconstructing the high-resolution 3D image using the 2D image slices.

8. The method according to claim 5, wherein the high-resolution 3D image corresponds to an MRI scan of a brain, further wherein the high-resolution segmentation identifies a plurality of anatomical regions in the brain.

9. The method according to claim 5, wherein the high-resolution module is trained on randomly sampled patches of a training dataset comprising a plurality of high-resolution 3D images and corresponding high-resolution segmentations.

10. A method for measuring a volume of an object, the method comprising:
  acquiring a high-resolution 3D image of the object;
  segmenting the high-resolution 3D image using the method of claim 5; and
  counting voxels in at least one segmented region to determine the volume of said at least one segmented region.

11. The method according to claim 10, wherein the high-resolution 3D image is an MRI scan of a brain, further wherein the at least one segmented region corresponds to at least one anatomical region of the brain.

* * * * *